United States Patent Office 2,985,534
Patented May 23, 1961

2,985,534

BACITRACIN PRODUCT AND PROCESSES

Ralph Allan Zorn, Ronald C. Malzahn, and Austin M. Hanson, Muscatine, Iowa, assignors to Grain Processing Corporation, Muscatine, Iowa, a corporation of Iowa No Drawing. Filed Jan. 14, 1959, Ser. No. 786,684

12 Claims. (Cl. 99—2)

This invention relates to a bacitracin product and the process for preparing the same.

It is well known that bacitracin may be prepared by the cultivation of microorganisms, such as *Bacillus subtilis*, and particularly *Bacillus licheniformis*. This antibiotic has recently found considerable application in the preparation of feeds for poultry and livestock. Thus, when bacitracin is incorporated into feeds, a marked stimulation of the growth of the poultry or livestock is observed.

One difficulty with bacitracin is, however, that it is unstable under ordinary conditions of storage. Also, in the production of bacitracin by fermentation methods a considerable amount of the bacitracin may be lost during the normal process of recovery, which process usually involves the steps of evaporating and drum drying the fermentation mash. The stability of bacitracin can be improved by the addition of a soluble manganese salt as described in copending application Serial No. 741,725, filed June 13, 1958. However, it has now been found possible further to improve the stability of such a product.

Accordingly, it is an object of this invention to provide a bacitracin composition which has a high degree of stability upon storage.

A further object of this invention is the provision of an animal feed supplement containing bacitracin which has been stabilized against deterioration upon storage even under the conditions of high humidity.

A still further object of this invention is the provision of a process for recovering bacitracin in a manner which permits a high percentage of recovery with small losses as compared to prior art recovery procedures.

Further and additional observations will appear from the following description and the accompanying claims.

In accordance with one embodiment of this invention it has been found that an improved bacitracin containing product may be prepared by adding thereto a small amount of a water soluble compound of manganese and a small amount of a water soluble reducing agent. The manganese compound in combination with the reducing agent serves to stabilize the bacitracin against deterioration on storage and is more effective than the use of the manganese compound alone. The invention is particularly useful in the preparation of animal feed supplements which contain a nutrient base and bacitracin. In this instance the bacitracin is also treated with water soluble manganese salt and the water soluble reducing agent in order to stabilize the bacitracin in the feed product.

This invention has particular utility in the treatment of fermentation mashes for the recovery of bacitracin from fermentation mashes in which it is produced. Thus in accordance with this invention, the fermentation mash containing the bacitracin is treated with a small amount of a water soluble manganese salt and a small amount of a water soluble reducing agent prior to the time that the fermentation mash is evaporated and drum dried by conventional procedures. It has been discovered that by the incorporation of the reducing agent in addition to the manganese salt in this manner smaller amounts of bacitracin are lost in the subsequent concentrating and drying procedure than if only the manganese compound is used.

For a more complete understanding of this invention, reference will now be made to a specific example. It will be understood, of course, that the invention is not to be limited to the specific example given since it will be apparent that many modifications may be made without departing from the spirit and scope of the invention.

An aqueous fermentation medium is prepared containing 7.5% soybean flour, 2.0% corn starch, 1.0% calcium carbonate, and 0.33% magnesium sulfate. This medium is sterilized by conventional techniques and then inoculated with one-half volume percent of a 24-hour liquid culture of *Bacillus licheniformis*. The inoculated medium is then incubated at about 30° C. under constant aeration conditions for a period of 30 hours. At the end of the fermentation period the pH is about 8.1. The fermentation mash typically contains 200 units of bacitracin per milliliter.

After the fermentation has been completed, 1.0% by weight of manganese sulfate plus 1.0% by weight of sodium thiosulfate are added to and thoroughly mixed with the liquid fermentation mash. Thereafter the fermentation mash is concentrated in a conventional evaporator and then drum dried. A feature of this invention is that the manganese compound and the reducing agent prevent excessive losses of bacitracin in the concentrating and drying steps and about 80 percent of the bacitracin in the original fermentation mash is recovered in the final dried product. The concentration of the bacitracin is typically 20 grams per pound of the dried product.

This product is suitable for sale to feed manufacturers as such or it may be standardized to a predetermined bacitracin potency utilizing corn meal, soybean meal, or other nutrient diluent. Thus, one suitable feed supplement is one in which about equal parts of the drum dried material and corn meal are blended to produce a product containing 10 grams of bacitracin per pound of feed supplement.

A characteristic of the drum dried material and of the feed supplement is that the bacitracin contained therein is very stable under storage conditions. This is particularly important where the bacitracin is employed in feeds that may be stored for some time before being consumed. In order to demonstrate the stability of the products of this invention the following procedure was used to give a rapid evaluation: A one gram sample of a dried bacitracin-containing fermentation residue is placed in a screw-cap, plastic tape sealed 200 x 25 mm. tube and subjected to the heat of flowing steam (99° C.) for varying periods of time. The potency of the heat treated sample was compared with the original material to provide recovery data which indicate the relative stability imparted by the processing procedures to bacitracin. In one experiment five bacitracin products consisting of the dried fermentation residues from a *Bacillus licheniformis* were prepared essentially as indicated in the example. The control contained no added manganese compound or reducing agent, one contained manganese sulfate which was added after fermentation but before drying, and the others, in addition to the manganese sulfate, contained the indicated reducing agent also added after fermentation but before drying.

Data illustrating the results obtained from the above stability test procedure are shown in Table 1. The data provide an index of the storage stability of bacitracin processed by various procedures.

*Table 1.—The steam chest stability of five bacitracin products*

| Bacitracin product | Recovery after steaming | | |
|---|---|---|---|
| | 1 hour, percent | 2 hours, percent | 3 hours, percent |
| Untreated control | 19.4 | 9.4 | 5.1 |
| 1% Manganese sulfate | 84.8 | 68.9 | 61.1 |
| 1% Manganese sulfate+1% sodium thiosulfate | 84.8 | 84.3 | 81.3 |
| 1% Manganese sulfate+1% sodium hydrosulfite | 82.6 | 75.0 | 78.4 |
| 1% Manganese sulfate+1% sodium bisulfite | 78.8 | 66.1 | 63.7 |

Table 1 shows that stability is enhanced if a reducing agent is added along with the manganese compound.

The effect of the reducing agent is illustrated more effectively when the moisture content of the samples is controlled or adjusted to the same level in each case. This is shown in the following experiments. In one experiment, various preparations were made as indicated in the example at two moisture levels containing no stabilizer, $MnSO_4$, and $MnSO_4$ with $Na_2S_2O_3$. This was accomplished by adding nothing, 1% $MnSO_4$, and 1% $MnSO_4$ plus 1% $Na_2S_2O_3$ to aliquots of bacitracin broth (produced as described above) which were then evaporated under vacuum and drum dried. Portions of each of the drum dried preparations were further dried in an oven. Appropriate amounts of material at the two moisture levels were blended to obtain desired moisture contents ranging from 5.0 to 8.0 percent. The samples thus obtained were tested by the accelerated procedure described above with the results shown in Table 2.

*Table 2.—The steam chest stability of three bacitracin products at 5, 6, 7 and 8 percent moisture*

| Bacitracin product | Moisture content, percent | Recovery after steaming | | |
|---|---|---|---|---|
| | | 1 hour, percent | 2 hours, percent | 3 hours, percent |
| Untreated control | 5 | 22.2 | 12.2 | ca 4.3 |
| | 6 | 19.4 | 9.4 | ca 5.1 |
| | 7 | 18.7 | 11.0 | ca 7.4 |
| | 8 | 16.4 | ca 7.3 | ca 4.4 |
| 1% $MnSO_4$ | 5 | 90.4 | 76.5 | 73.9 |
| | 6 | 79.7 | 59.0 | 62.5 |
| | 7 | 83.2 | 57.5 | 33.8 |
| | 8 | 76.2 | 52.4 | 35.4 |
| 1% $MnSO_4$+1% $Na_2S_2O_3$ | 5 | 83.7 | 79.7 | 71.2 |
| | 6 | 87.5 | 83.8 | 71.2 |
| | 7 | 90.2 | 79.9 | 70.3 |
| | 8 | 79.8 | 73.6 | 65.1 |

It is apparent, therefore, that although $MnSO_4$ greatly improved the stability of untreated bacitracin, a further stabilization was accomplished through the use of the reducing agent, particularly at the higher moisture levels. This is of importance in connection with use of the material in pelleting operations where steam is used to condition the feed, and in storage of finished feed in areas of high temperature and humidity.

In another experiment, portions of bacitracin fermentation broth (produced as above) were treated with nothing, 1% $MnSO_4$ and 1% $MnSO_4$ plus 1% $Na_2S_2O_3$. The mixtures were concentrated under vacuum and drum dried. The preparations were then treated with steam at atmospheric pressure to obtain various moisture levels. The samples so obtained were subjected to the accelerated stability test as before with the results indicated in Table 3.

*Table 3.—The steam chest stability of three bacitracin products at various moisture levels*

| Bacitracin product | Moisture content, percent | Recovery after steaming | |
|---|---|---|---|
| | | 1.5 hours, percent | 3 hours, percent |
| Untreated control | 7.3 | ca 6.1 | ca 6.2 |
| | 9.1 | 11.5 | 13.3 |
| 1% $MnSO_4$ | 5.4 | 80.2 | 67.8 |
| | 7.1 | 74.4 | 51.0 |
| | 8.9 | 58.0 | 20.1 |
| | 9.8 | 42.1 | 10.4 |
| 1% $MnSO_4$+1% $Na_2S_2O_3$ | 4.8 | 86.7 | 72.9 |
| | 7.0 | 83.3 | 73.3 |
| | 8.2 | 89.7 | 62.5 |
| | 9.7 | 77.8 | 40.6 |

Again it is seen that the addition of $MnSO_4$ provided stabilization compared with the untreated bacitracin, but further stabilization resulted from the addition of the reducing agent together with the $MnSO_4$.

A further indication of the value of the reducing agent in improving the stability of bacitracin treated with manganese is the history of production lots in storage. Table 4 shows the time in storage and the potency after storage expressed as percent of the original activity. Typically, 1200 lbs. each of $MnSO_4 \cdot H_2O$ and $Na_2S_2O_3 \cdot H_2O$ were added to 15,000 gallons of fermentation broth at the end of the fermentation cycle. Agitation was continued until the chemicals were dissolved when the entire broth was pumped to a vacuum evaporator. The syrup from the evaporator was pumped to atmospheric double drum driers and dried.

*Table 4.—Stability of production lots of feed grade bacitracin in storage*

| Lot | Stabilizer | Storage time, days | Recovery, percent |
|---|---|---|---|
| 1 | $MnSO_4$ | 31 | 76 |
| 2 | $MnSO_4$ | 31 | 83 |
| 3 | $MnSO_4$ | 48 | 89 |
| 4 | $MnSO_4$ | 21 | 89 |
| 5 | $MnSO_4$ | 41 | 90 |
| 6 | $MnSO_4$+$Na_2S_2O_3$ | 24 | 106 |
| 7 | $MnSO_4$+$Na_2S_2O_3$ | 24 | 107 |
| 8 | $MnSO_4$+$Na_2S_2O_3$ | 43 | 98 |
| 9 | $MnSO_4$+$Na_2S_2O_3$ | 30 | 100 |
| 10 | $MnSO_4$+$Na_2S_2O_3$ | 21 | 94 |

It is apparent that, although reasonably good stability was achieved with manganese, the addition of thiosulfate essentially eliminated decomposition during the period of storage.

In the foregoing examples and experiments manganese sulfate has been specifically referred to as the manganese compound. However, other nontoxic water-soluble compounds may be used to supply the necessary manganese component, and they include manganous chloride, manganous nitrate, manganous bromide, manganous acetate, soluble manganous phosphates and the like. The concentration of the manganese in the treated fermentation mash may be widely varied but is usually within the range of about .005 to 3.0 percent of the fermentation mash, preferably between about 0.15 and 1.3 percent. Expressed in terms of bacitracin potency, the concentration of manganese employed is preferably between about 0.6 and 300 percent of the weight of the bacitracin.

Also in the foregoing sodium thiosulfate, sodium hydrosulfite and sodium bisulfite have been specifically mentioned. However, it will be readily apparent that the corresponding ammonium or potassium compounds may be employed and likewise other nontoxic water-soluble reducing agents may be used. The amount of reducing agent may be varied but is usually within the range of about .01 to 5.0 percent of the fermentation mash, preferably between about 0.3 and 2.0 percent. Expressed in terms of bacitracin potency, the concentration of the reducing agent is preferably between about 0.6 and 300 percent of the weight of bacitracin in the product.

Also in the specific example only one specific fermentation medium is referred to. However, it will be apparent to one skilled in the art that there may be variations in this regard and that the process is applicable for the recovery and production of bacitracin from other types of fermentation mashes.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process of recovering bacitracin from an aqueous fermentation mash containing same which comprises adding to said mash between about .005 and 3.0 percent of manganese in the form of a nontoxic, water-soluble manganese salt and between about .01 and 5.0 percent of a nontoxic, water-soluble reducing agent and thereafter drying said mash.

2. The process recited in claim 1 wherein said manganese salt is manganese sulfate.

3. The process recited in claim 1 wherein said reducing agent is selected from the group consisting of thiosulfates, hydrosulfites and bisulfites.

4. A process of recovering bacitracin from an aqueous fermentation mash containing same which comprises adding to said mash a nontoxic, water-soluble manganese salt and sodium thiosulfate and thereafter drying said mash.

5. A process of recovering bacitracin from an aqueous fermentation mash containing same which comprises adding to said mash about one percent by weight of manganese sulfate and about one percent by weight of sodium thiosulfate and thereafter drying said mash.

6. A fermentation mash containing bacitracin stabilized by treatment with a nontoxic water-soluble compound of manganese and a nontoxic water-soluble reducing agent in the presence of water, the concentration of manganese and the reducing agent in the mash being sufficient to stabilize the bacitracin and each being between about 0.6 and about 300 percent of the weight of the bacitracin present.

7. A fermentation mash containing bacitracin stabilized by treatment with a nontoxic water-soluble manganese salt and a nontoxic water-soluble reducing agent selected from the group consisting of thiosulfates, hydrosulfites and bisulfites in the presence of water, the concentration of manganese and the reducing agent in the mash being sufficient to stabilize the bacitracin and each being between about 0.6 and 300 percent of the weight of the bacitracin present.

8. An animal feed supplement comprising a fermentation residue, bacitracin, a nontoxic water-soluble compound of manganese and a nontoxic water-soluble reducing agent, the concentration of the manganese and said reducing agent in said supplement being sufficient to stabilize the bacitracin and each being between about 0.6 and about 300 percent of the weight of the bacitracin therein.

9. An animal feed supplement comprising a fermentation residue and bacitracin stabilized by treatment with a nontoxic water-soluble manganese salt and a nontoxic water-soluble reducing agent selected from the group consisting of thiosulfates, hydrosulfites and bisulfites in the presence of water, the concentration of the manganese and said reducing agent in said supplement being sufficient to stabilize the bacitracin and each being between about 0.6 and about 300 percent of the weight of the bacitracin therein.

10. In a process for recovering bacitracin from an aqueous fermentation mash containing same, the steps of adding to said mash a nontoxic, water-soluble manganese salt and a nontoxic, water-soluble reducing agent and thereafter removing at least a portion of the water from said mash.

11. The process recited in claim 10 wherein the amount of manganese added to said mash as the salt is between about 0.005 and 3.0 percent and the amount of reducing agent added to said mash is between about 0.01 and 5.0 percent.

12. The process recited in claim 10 in which the amount of manganese in the salt added and the amount of reducing agent added are each equivalent to between about 0.6 and 300 percent of the weight of the bacitracin present in the aqueous mash.

References Cited in the file of this patent

UNITED STATES PATENTS

| | | |
|---|---|---|
| 2,871,122 | Ott | Jan. 27, 1959 |
| 2,899,356 | Greenhalgh et al. | Aug. 11, 1959 |